United States Patent [19]

Booth

[11] 4,175,440

[45] Nov. 27, 1979

[54] APPARATUS FOR DYNAMICALLY TESTING GOLF CLUBS

[76] Inventor: W. Jesse Booth, P.O. Box 1122, Cordele, Ga. 31015

[21] Appl. No.: 932,441

[22] Filed: Aug. 10, 1978

[51] Int. Cl.$^2$ .......................... G01M 19/00; G01P 3/26
[52] U.S. Cl. .................................. 73/432 SD; 73/488
[58] Field of Search .......... 73/65, 13, 432 R, 432 SD, 73/488, 489, 493, 495, 502; 273/186 R, 186 A; 35/29 A

[56] References Cited

U.S. PATENT DOCUMENTS

| | | | |
|---|---|---|---|
| 3,561,272 | 2/1971 | Davis | 73/493 X |
| 3,855,842 | 12/1974 | Imabori et al. | 73/432 SD X |
| 4,062,222 | 12/1977 | Solheim | 73/432 SD X |

Primary Examiner—James J. Gill
Attorney, Agent, or Firm—Newton, Hopkins & Ormsby

[57] ABSTRACT

Golf clubs are dynamically tested and matched with other clubs by measuring and recording angular velocity and centrifugal force along the axis of a club shaft as the club is swung on an arcuate path in a manner closely duplicating an actual golfer's swing. The club handle is clamped to a linear slide carried by a rotary slide housing having an angle of inclination approximating the lie angle of a golf club during use. Adjustable power rotational drive means swings the club and centrifugal force developed at a given angular velocity of the club displaces the linear slide to activate associated hydraulic devices which measure and record centrifugal force along the club shaft axis in relation to angular velocity of the club. Club weights are then added or removed until the desired angular velocity and centrifugal pull are achieved.

13 Claims, 6 Drawing Figures

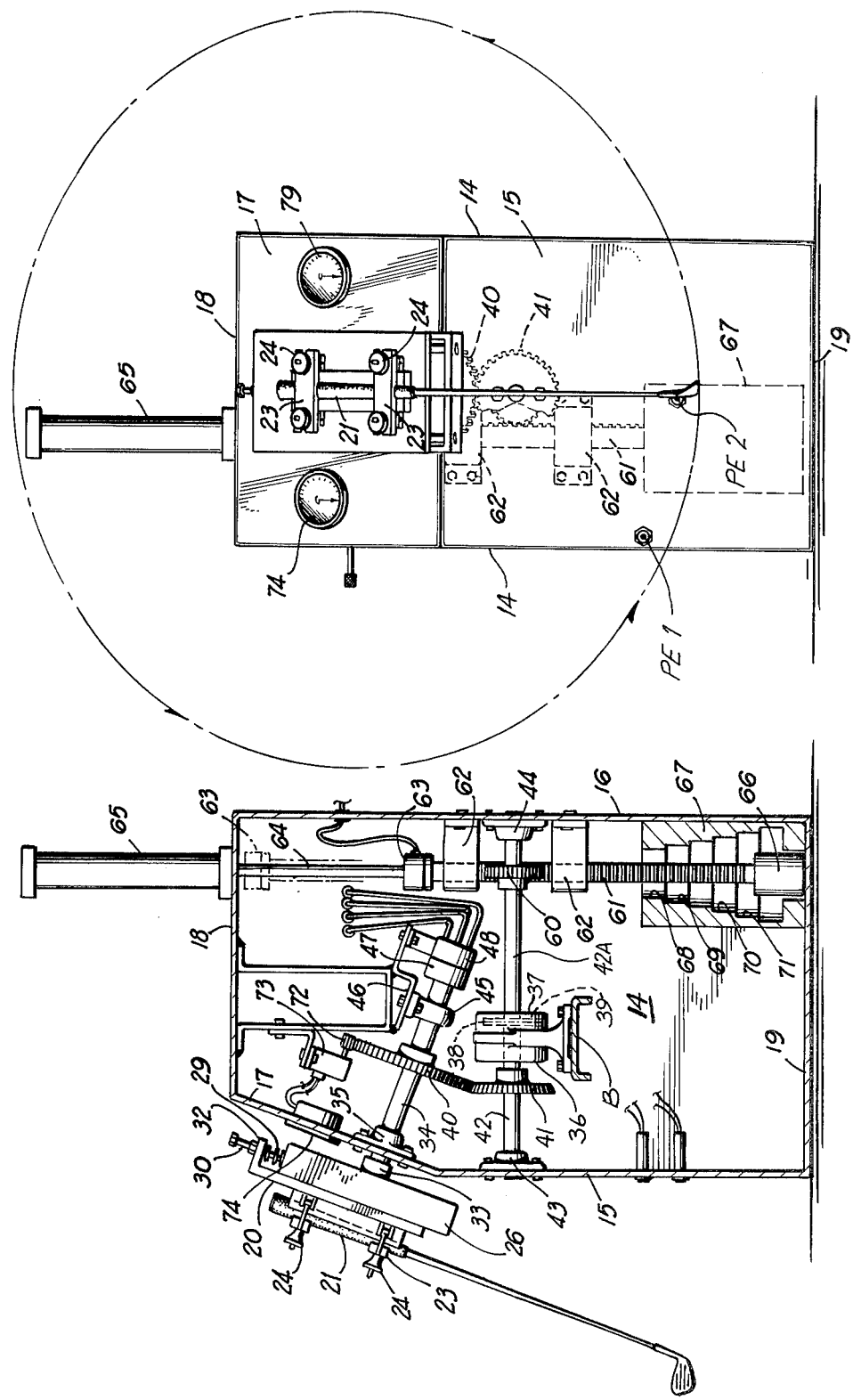

APPARATUS FOR DYNAMICALLY TESTING GOLF CLUBS

BACKGROUND OF THE INVENTION

It is common practice to carefully weight the heads of golf clubs in order to achieve the desired swing and balance characteristics. This weighting procedure is tedious, time consuming and costly and is usually done on a trial and error basis which adds significantly to the ultimate cost of high quality clubs.

Some devices are known in the prior art for testing golf clubs, either statically or dynamically, to measure their performance characteristics as by timing pendulum-like oscillations or measuring moment of inertia or torque exerted. Insofar as is known, no prior art test apparatus has been widely accepted in the art and the tedious and costly manual methods of weighting and balancing golf clubs continues to prevail to the detriment of the golfer.

In light of the above, it is the object of this invention to provide a truly practical and efficient dynamic tester for golf clubs wherein the club is precisely gripped at its handle and swung through an arc in a manner closely resembling the natural swinging of the club by a golfer while the club shaft is at an angle to the vertical closely approximating its natural angle during a swing. The test apparatus measures and records centrifugal force or pull along the club shaft axis for a given angular velocity of club movement or swing. Weights are carefully added or removed from the club head until exactly the desired swing velocity and centrifugal pull characteristics are achieved. The invention is thought to be a new approach to the testing and matching up of golf clubs which is so important in providing a high quality customized set of clubs.

Other features and advantages of the invention will appear to those skilled in the art during the course of the following description.

To comply with the requirement to disclose known prior art under 37 C.F.R. 1.56, the following domestic prior U.S. patents are made of record herein:

Nos. 1,351,768   2,094,806
Nos. 1,516,786   2,108,877
Nos. 1,742,394   2,349,736
Nos. 1,825,172   2,371,523
Nos. 1,953,916   3,377,845.

BRIEF DESCRIPTION OF THE DRAWINGS

FIG. 1 is a side elevation, partly in section, of a dynamic test apparatus for golf clubs.

FIG. 2 is a front elevation of the test apparatus.

DETAILED DESCRIPTION

Figure 3:
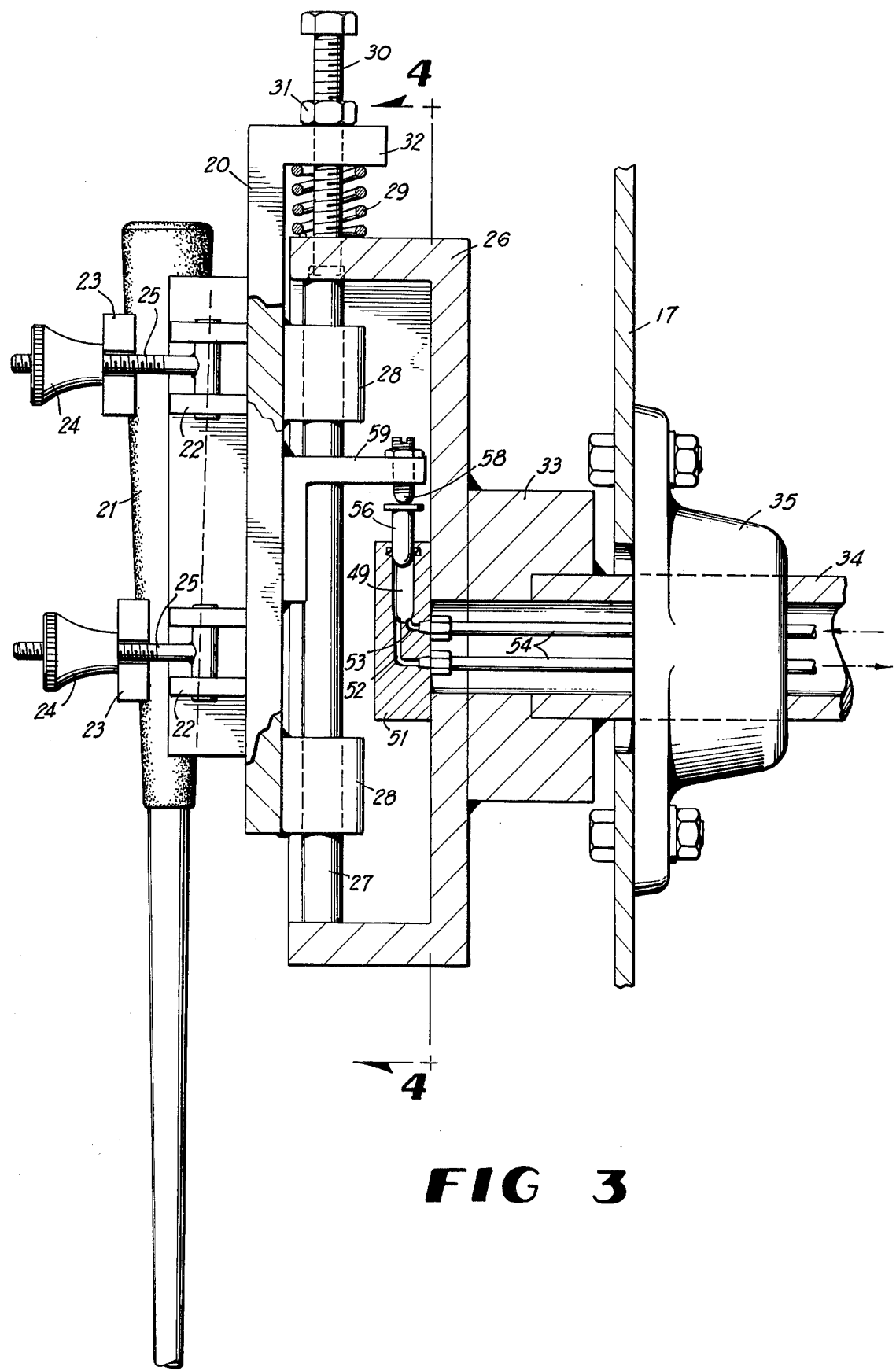
FIG. 3 is an enlarged fragmentary vertical section taken through a linear slide to which the golf club is attached and an associated rotational housing or support and related elements.
Figure 4:
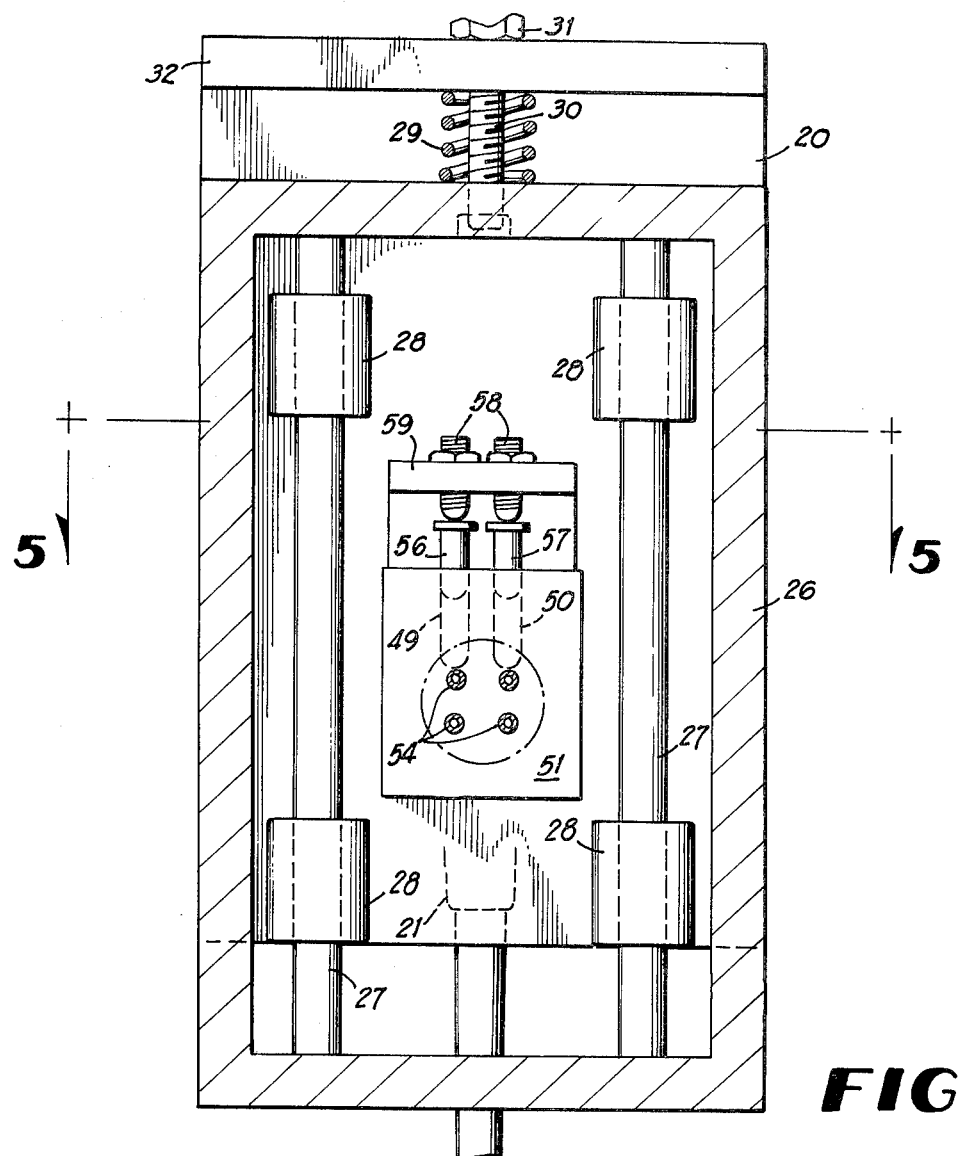
FIG. 4 is a vertical section taken on line 4—4 of FIG. 3.
Figure 5:
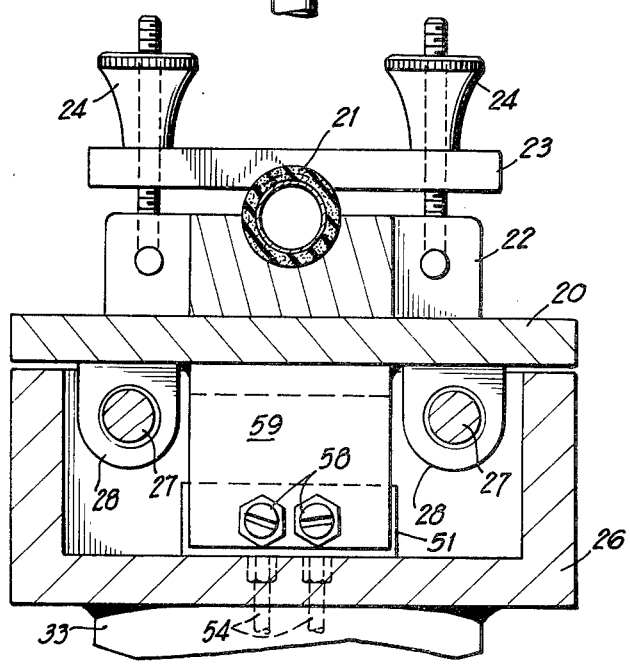
FIG. 5 is a horizontal section taken on line 5—5 of FIG. 4.

Referring to the drawings in detail wherein like numerals designate like parts, a golf club test apparatus shown in its entirety in FIGS. 1 and 2 includes a sturdy cabinet having side walls 14, front and rear vertical walls 15 and 16, an upper inclined front wall portion 17, a horizontal top wall 18, and a horizontal bottom wall 19 to rest on a level support surface.

The apparatus supported on and within the above-described cabinet comprises a linear slide 20 to which the handle 21 of a golf club undergoing dynamic testing is firmly attached in a precise position by a pair of spaced handle clasps 22 on the forward side of the slide 20 having separable clamping elements 23 adjustably engaged by threaded knobs 24 on screw-threaded studs 25 of the two clasps. The linear slide 20 is positioned at an angle to the vertical, FIG. 1, which closely approximates the shaft angle of the golf club during actual usage so that the test swing of the club will closely simulate a natural swing by a golfer.

The linear slide 20 which moves in response to centrifugal force is bodily mounted on a frontally open head or housing 26 having a pair of spaced parallel cylindrical guide posts 27 fixed therein at the same angle of inclination as the linear slide 20. Apertured guide bearings 28 rigidly attached to the rear of the slide 20 are engaged slidably with the guide posts 27, as shown in the drawings. Downward displacement of the slide 20 is resisted by a variable tension compression spring 29 surrounding a bolt 30 having its lower end anchored in the top wall of the head 26. An adjusting nut 31 on the bolt 30 serves to regulate the spring 29 and to form a limit stop for the upward movement of slide 20 which has a top ledge 32 engaging the top of the spring and adapted to abut the stop nut 31. The spring 29 biases the slide upwardly.

The rotary head 20 has a center hub 33 coupled to the leading end of a tubular drive shaft 34 disposed perpendicular to the linear movement axis of the slide 20 and journalled for rotation in forward bearing 35 on inclined cabinet wall 17. A further rear bearing 45 for the shaft 34 is secured to an inclined bracket 46 depending from the top wall 18 of the cabinet.

The inclined shaft 34 terminates in a hydraulic swivel, one element 47 of which is attached to the shaft 34 and companion element 48 is fixed to the bracket structure 46. This hydraulic swivel transmits fluid through internal porting, not shown, of a conventional nature, to and from remove cylinders 49 and 50 formed in a block 51 secured to the back wall of the head 26. Inlet and outlet ports 52 and 53 lead from the bottom of each cylinder 49 and 50 through the block 51 and are connected with fluid lines 54 extending through the bore of shaft 34, FIG. 3. These fluid lines 54 lead to a solenoid-operated valve 55, FIG. 6, whose purpose and operation will be described.

A pair of pistons 56 and 57 are engaged in the cylinder chambers 49 and 50 below a pair of adjustable screw actuators 58 carried by an L-bracket 59 rigid with the slide 20 and moving therewith on a linear path. At proper times, the actuators 58 drive the pistons 56 and 57 into the cylinder chambers 49 and 50, as will be further described.

Approximately midway between journals 35 and 45 on the shaft 34 is fixed a spur gear 40 meshing with and driven by a bevel gear 41 on a horizontal front-to-back power take-off shaft 42 journalled in bearings 43 and 44 on the cabinet walls 15 and 16, respectively. Aft of bevel gear 41, shaft 42 is terminated within the housing of an electro-magnetic brake and clutch unit 36. The brake and clutch unit 36 is mounted on a cross support beam B mounted between side walls 14. A second shaft 42A journaled in the brake and clutch housing extends rearwardly of such clutch unit coaxial with forward shaft 42 and is journaled in rear bearing 44 as previously described.

The clutch unit 36 houses a clutch face 38 fixed to one end of shaft 42 and a complementary clutch face 39 fixed to the end of shaft 42A.

In operation, the sequential steps of attaining a matched balance in a given set of clubs are as follows:

1. Electrical power is energized to implement internal and external support systems; an air compressor compresses air to power pneumatic cylinder 65; oil pump 82 pressurizes and warms the oil to operate the hydraulics. Electricity is supplied to the lifting electromagnet 63 and to electro-magnetic brake and clutch unit 36, along with photoelectric cells PE1 and PE2 which govern the clutch and brake, respectively, of unit 36.

2. A switch (not shown) is thrown to release the brake and clutch unit 36, while the club is positioned at six o'clock.

3. A switch (not shown) is thrown to engage the clutch 38-39 of unit 36.

4. A switch (not shown) is thrown to activate the air cylinder 65 to pick up the dead weight which simultaneously makes a controlled back swing of the club from six o'clock to three o'clock. The weight is raised via energized electromagnet 63 mounted on piston rod 64 magnetically coupled to rack 61. When back swing of the club reaches three o'clock, air cylinder 65 stroke terminates.

5. A switch (not shown) is thrown to de-energize electromagnet 63 which releases rack 61 and dead weight 66 to obtain power swing and drive the club through a balancing cycle. Photoelectric cell PE1 releases the clutch 38-39 at five forty-five o'clock and photoelectric cell PE2 engages the brake of unit 36 at three o'clock wherein controlled braking is implemented and the club comes to rest at six o'clock after a full revolution, during which time the tachometer has recorded the velocity, the travel dial 79 has recorded centrifugal pull in linear measurement and a small amount of oil has been displaced into a vial 81 as a tangible record for the test.

The shaft 42A is driven by a spur gear 60 thereon in mesh with a vertical rack 61 within the cabinet of the apparatus and operating through a pair of spaced guides 62 secured to the wall 16. The rack is coupled through an electromagnet 63 at its top end with the piston rod 64 of a pneumatic cylinder 65 atop the cabinet wall 18. The lower end of rack 61 carries a weight 66 which can be increased or decreased in magnitude. A stepped canister 67 is fixed on cabinet bottom wall 19 with its topmost step or opening 68 only slightly larger than the diameter of the weight 66, the successive openings 69, 70, 71, etc. below the top opening being increasingly larger in diameter. When the piston rod 64 retracts upwardly to raise the rack 61 and weight 60, the shaft 42A will be driven in clockwise rotation. When the rack and weight are subsequently dropped, the fall of the weight 66 is dampened within the smallest opening 68 due to trapped air in the canister 67 and the degree of dampening is lessened at each successively larger step 69, 70, 71, etc. due to the ability of more air to escape from the canister. This controlled dampening action on the falling weight and rack causes the arcuate swing of the club being tested to closely duplicate the actual swing of a golfer and is one of the novel features of the invention.

The top of spur gear 40, FIG. 1, is in mesh with a small tachometer drive gear 72 coupled with a tachometer 73 on the internal bracket structure 46. A tachometer read-out instrument 74 on the inclined wall 17 of the cabinet gives a reading of the angular velocity of the golf club during its powered swing caused by the free fall descent of the weighted rack 61.

Whenever the head 26 is caused to rotate by the fall of the weighted rack 61 and the action of the intervening gearing shown in FIG. 1, centrifugal force acting on the golf club along the inclined axis of its shaft will cause downward displacement of the linear slide 20 against the spring 29 and depression of the two pistons 56 and 57 by the actuators 58. Such action will pressurize hydraulic fluid in the cylinder chambers 49 and 50.

Figure 6:
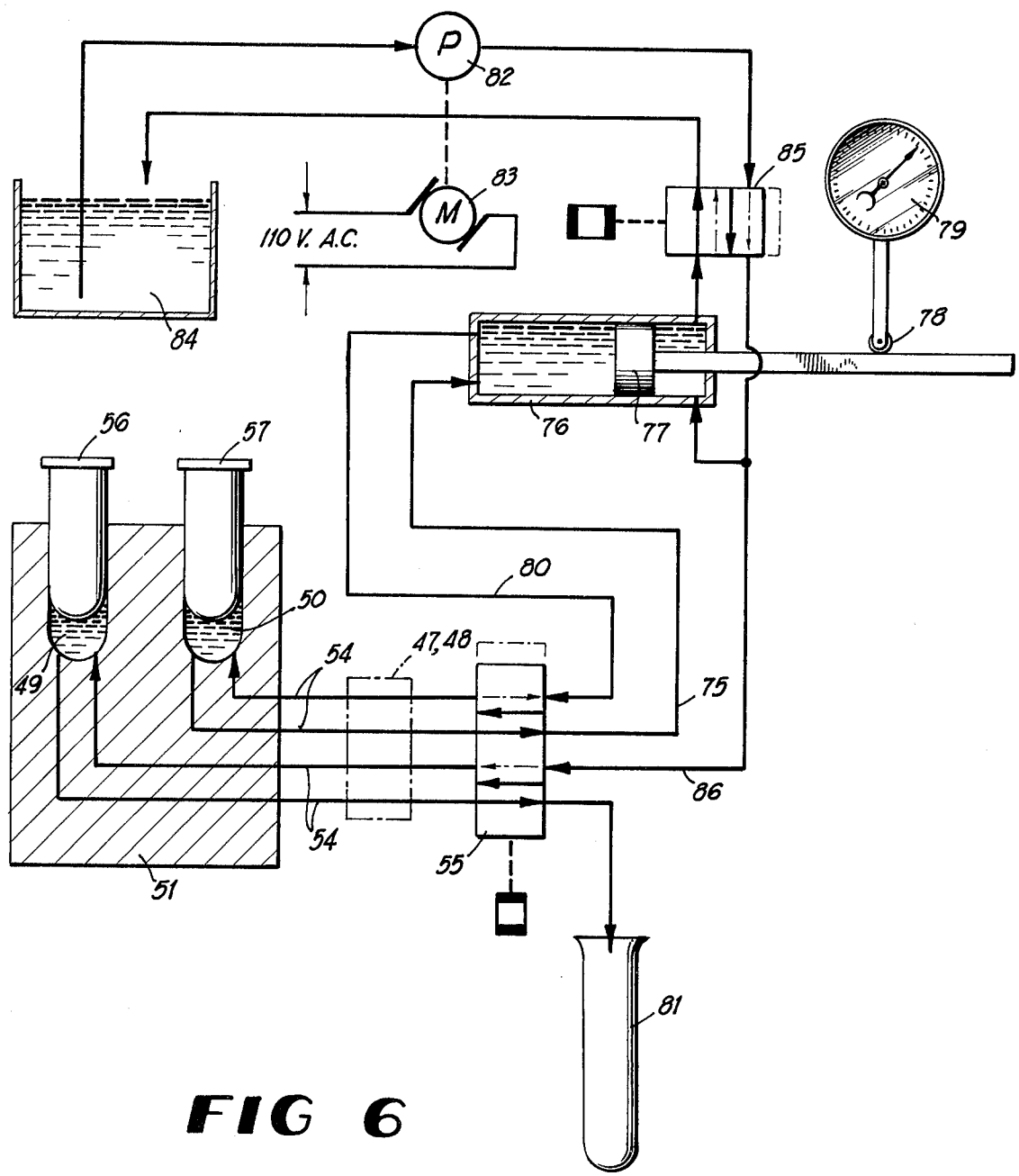
FIG. 6 is a schematic view of a hydraulic testing and recording circuit employed with the mechanical components shown particularly in FIGS. 3 to 5 of the drawings.

Referring to FIG. 6, fluid from the cylinder 50 at this time is forced through the valve 55 via hydraulic line 75 to a remote hydraulic cylinder 76 containing a piston 77. The rod of this piston frictionally engages the drive roller 78 of a travel meter 79 whose dial indicates in pounds the centrifugal force or pull generated along the axis of the golf club shaft during its swing in the apparatus. The cylinder chamber 50 and remote cylinder 76 are connected in a closed loop by lines 75 and 80 through the solenoid valve 55. The two cylinders 50 and 76 are inversely proportional in size and the direction of fluid flow in the closed loop is dependent upon the position of the valve 55.

The second cylinder 49 pressurized by downward displacement of the linear slide 20 is not directly connected with the mechanism except through the actuator 58 and piston 56. The cylinder chamber 49 when pressurized by the descent of its piston 56 meters an amount of fluid matching the volume of chamber 50 into a collecting vial 81 through valve 55 to be kept as a physical record of the golf club test. The cylinder 49 unlike its twin cylinder 50 must be refilled with fluid on each test cycle. To accomplish this, a pump 82 driven by a motor 83 delivers fluid from a reservoir 84 through a solenoid operated valve 85 and line 86 to replenish the fluid in the chamber 49 after each cycle of operation.

Thus, it may be seen that the apparatus swings the golf club through an arcuate path in a manner closely duplicating a club swing by a golfer. During such simulated swing, angular velocity of the club is measured on the tachometer instrument 74 and centrifugal force along the axis of the club shaft is measured or recorded on the instrument 79. The necessary adjustments of weight on the club head are made until precisely the desired angular velocity and centrifugal pull are obtained.

The external controls of the apparatus to start the cycle of operation and to control the brake and clutch unit are conventional and need not be described for a proper understanding of the invention. Suffice it to say, that when the apparatus is started up, the pump motor 83 is energized and the pneumatic cylinder 65 and lifting electromagnet 63 are also energized. The brake and clutch unit is active and as the piston rod 64 retracts upwardly the golf club moves to the top of its back swing and the weight 66 moves upwardly to and beyond the top of the canister 67. The lifting electromagnet 63 is de-energized as is the electromagnetic brake 36 and the weighted rack 61 with weight 66 falls powering the golf club on its forward swing closely duplicating a swing of the club by an actual golfer. During this action, the pump 82 continues to operate and the previously described recordings on the two instruments 74 and 79 are obtained with the cylce of operation terminating at the completion of the powered swing of the golf club and the full descent of the weight 66.

I claim

1. An apparatus for dynamically testing golf clubs comprising a rotary inclined shaft having a head, a linear slide carried by said head on a linear movement axis across the head, a club shaft adjustable clasp means carried by the linear slide, the linear movement axis of the slide and the axis of the clasp means being substantially normal to the axis of the rotary inclined shaft and approximating the normal inclination of a club shaft during actual usage by a golfer, an angular velocity indicator drivingly coupled with the rotary inclined shaft to indicate the angular velocity of a club being tested, means to power said rotary inclined shaft in one direction of rotation to move a club being tested on a backstroke, means to then move the club being tested on a forward power stroke, and fluid pressure responsive means operated by displacement of the linear slide due to centrifugal force acting on the club and slide during the forward power stroke and including a centrifugal force indicator.

2. An apparatus for dynamically testing golf clubs as defined in claim 1, and said fluid pressure responsive means including at least a serially connected pair of cylinder-piston units with one unit operatively coupled to said centrifugal force indicator and the other unit having a connection with said linear slide and responding to centrifugal force induced movement of the slide.

3. An apparatus for dynamically testing golf clubs as defined in claim 1, and said means to power said rotary inclined shaft in one direction of rotation comprising a fluid pressure operated linear actuator, a rack connected with said linear actuator, and gearing drivingly interconnecting said rack and said rotary inclined shaft.

4. An apparatus for dynamically testing golf clubs as defined in claim 3, and an electromechanical brake and clutch unit connected in said gearing.

5. An apparatus for dynamically testing golf clubs as defined in claim 3, and an electromagnet coupling between said rack and linear actuator, and a selective weight on said rack adapted to fall with the rack when the electromagnet coupling is de-energized, whereby said rack then drives said rotary inclined shaft in an opposite direction of rotation.

6. An apparatus for dynamically testing golf clubs as defined in claim 5, and a means to retard the falling of said weight and rack to render said forward power stroke of the club substantially like the power stroke of a club in the hands of a golfer.

7. An apparatus for dynamically testing golf clubs as defined in claim 6, and said retarding means comprising a canister having a stepped bore in axial alignment with said weight and rack with the smallest step of the bore arranged uppermost in the canister and the steps below the uppermost step being successively larger in diameter toward the bottom of the canister.

8. An apparatus for dynamically testing golf clubs as defined in claim 1, and said fluid pressure responsive means comprising a pair of cylinder-piston units on said head of the rotary inclined shaft, and a pair of actuator elements for the pistons of said units on said linear slide.

9. An apparatus for dynamically testing golf clubs as defined in claim 8, and fluid lines coupled with the cylinders of said units and extending through a bore of said rotary inclined shaft to a fluid swivel including an element on said shaft.

10. An apparatus for dynamically testing golf clubs as defined in claim 9, and fluid circuit means including a centrifugal force indicating instrument connected with said fluid swivel.

11. An apparatus for dynamically testing golf clubs as defined in claim 1, and spaced guide bearings on said linear slide projecting into a cavity of said head, and spaced parallel guideposts for said bearings spanning said cavity in a direction across the axis of said rotary inclined shaft.

12. An apparatus for dynamically testing golf clubs as defined in claim 11, and a spring interposed between said linear slide and said head and resisting linear movement of the slide in the direction induced by centrifugal force on the club and slide.

13. An apparatus for dynamically testing golf clubs as defined in claim 1, and a fluid swivel coupled with said rotary inclined shaft for delivering fluid to said fluid pressure responsive means.

* * * * *